United States Patent [19]

Toyoshima et al.

[11] Patent Number: 4,780,005
[45] Date of Patent: Oct. 25, 1988

[54] SEALED THRUST BALL BEARING

[75] Inventors: Hiroyuki Toyoshima; Kazuo Uchida, both of Osaka, Japan

[73] Assignees: Honda Giken Kogyo Kabushiki Kaisha, Tokyo; Koyo Seiko Co., Ltd., Osaka, both of Japan

[21] Appl. No.: 46,220

[22] Filed: May 5, 1987

[30] Foreign Application Priority Data

May 6, 1986 [JP] Japan .............................. 61-68573[U]

[51] Int. Cl.[4] ............................................. F16C 33/78
[52] U.S. Cl. .................................................... 384/607
[58] Field of Search ............... 384/607, 615, 617, 482, 384/539

[56] References Cited

U.S. PATENT DOCUMENTS

| 4,120,543 | 10/1978 | Greene, Jr. et al. . |
| 4,368,932 | 1/1983 | Wolzenburg ......................... 384/607 |
| 4,400,041 | 8/1983 | Lederman . |
| 4,466,751 | 8/1984 | Huguchi .............................. 384/607 |
| 4,505,524 | 3/1985 | Krall . |
| 4,566,812 | 1/1986 | Takei et al. . |

FOREIGN PATENT DOCUMENTS 58-124825 5/1983 Japan .

Primary Examiner—Lenard A. Footland
Attorney, Agent, or Firm—Armstrong, Nikaido, Marmelstein & Kubovcik

[57] ABSTRACT

A sealed thrust ball bearing having a plurality of balls rollable between a first race and a second race and elastic seal members sealing the clearance between the inner peripheral portions of the races and the clearance between the outer peripheral portions of the races. The first race has a hollow cylindrical portion on its inner periphery extending toward the second race with an inner elastic seal member fixedly fitted to an outer side thereof. The second race has a hollow cylindrical portion on its outer periphery extending toward the first race with an outer elastic seal member fixedly fitted to an inner side thereof. The inner elastic seal member has a lip in intimate contact with the inner peripheral portion of the second race. The outer elastic seal member has a lip supporting the axially outer face of the outer peripheral portion of the first race in intimate contact with the face.

5 Claims, 1 Drawing Sheet

SEALED THRUST BALL BEARING

BACKGROUND OF THE INVENTION

The present invention relates to a sealed thrust ball bearing which is useful, for example, as the strut bearing of motor vehicles.

FIG. 2 shows a known bearing of this type (see Unexamined Japanese Patent Publication SHO No. 58-124825). The illustrated bearing comprises a first race 1, a second race 2, a plurality of balls 3 rollable therebetween and an elastic seal member 4 sealing a clearance between the inner peripheral portions of the first and second races 1, 2 and a clearance between the outer peripheral portions thereof. The sealing member 4 is directly bonded by heating to the surface of the first race 1 other than the raceway 1a thereof and is integrally formed with lips 4a, 4b at its inner and outer peripheral portions for closing the inner and outer clearances between the first and second races 1, 2. The inner peripheral portion of the second race 2 is formed with a hollow cylindrical portion 2b having an annular groove 5 formed in its radially outer surface. The inner lip 4a of the seal member 4 is fitted in the groove 5, whereby the first and second races 1, 2 are fixed to each other as an assembly.

When such a sealed thrust ball bearing is to be used as a strut bearing, the races 1 and 2 are plated with a corrosion inhibitive layer, so that the seal member 4 is bonded to the surface of the plating layer with reduced bond strength. Further the races 1, 2 are hardened after press forming and therefore become distorted. The distortion creates a clearance between the race 1 and the mold during the bonding of the seal member 4, with the result that the rubber for forming the seal member 4 is likely to flow onto the raceway 1a. Further since the press-formed race 2 is machined to form the groove 5, there arises the problem that the grooved portion 5 becomes rough-surfaced to cause marked wear to the inner lip 4a of the seal member 4 by sliding contact therewith.

SUMMARY OF THE INVENTION

An object of the present invention is to provide a sealed thrust ball bearing including seal members which can be held to the races reliably.

Another object of the invention is to provide a ball bearing of the type mentioned wherein the seal member is unlikely to flow onto the raceway.

Another object of the invention is to provide a ball bearing of the type mentioned wherein the lip of the seal member is less susceptible to wear.

More specifically, the present invention provides a sealed thrust ball bearing comprising a first race, a second race, a plurality of balls rollable therebetween and elastic seal members sealing a clearance between the inner peripheral portions of the first and second races and a clearance between the outer peripheral portions of the races, the bearing being characterized in that the first race is formed at its inner periphery with a hollow cylindrical portion extending toward the second race, the second race being formed at its outer periphery with a hollow cylindrical portion extending toward the first race, an inner elastic seal member being fixedly fitted to the outer side of the first race cylindrical portion, an outer elastic seal member being fixedly fitted to the inner side of the second race cylindrical portion, the inner elastic seal member having a lip in intimate contact with the inner peripheral portion of the second race, the outer elastic seal member having a lip supporting the axially outer face of the outer peripheral portion of the first race in intimate contact with the face.

With the sealed thrust ball bearing of the present invention, the two seal members are fixedly fitted to the cylindrical portions of the inner and outer races, respectively, so that the seal members can be held fitted to the races reliably with high strength even if the races are plated for the inhibition of corrosion. Since this arrangement eliminates the need to bond the seal members to the races unlike the prior art, there is no likelihood that the race, if distorted after press forming, will permit the sealing material to flow onto the raceway. The lip of the outer elastic seal member is in intimate contact with and supports the axially outer face of the outer peripheral portion of the first race. This eliminates the need to form the groove conventionally necessary, consequently permitting the lip to slidingly contact the smooth pressed surface of the race, hence diminished wear of the lip.

Preferably, the first race is formed at its outer periphery with a bent portion bent obliquely toward the second race, and the lip of the outer elastic seal member is in intimate contact with the axially outer face of the bent portion to support the first race.

The lip of the outer elastic seal member then reliably supports the first race to hold the two races in the form of an assembly.

Further preferably, the lip of the inner elastic seal member extends obliquely inward radially thereof into intimate contact with the axially inner face of the inner peripheral portion of the second race.

The inner seal member then reliably prevents mud, water or the like from ingressing into the assembly from inside radially thereof.

Further preferably, the outer elastic seal member is bonded to the inner side of a metal core substantially in the form of a hollow cylinder, and the metal core is press-fitted in the cylindrical portion of the second race. The metal core has at its one end a flange in contact with the end face of the second race cylindrical portion and is formed with an inward flange at the other end thereof fitted in the cylindrical portion.

The metal core can then be firmly fitted in the cylindrical portion of the second race to hold the outer elastic seal member more reliably.

DESCRIPTION OF THE PREFERRED EMBODIMENT

Figure 1:
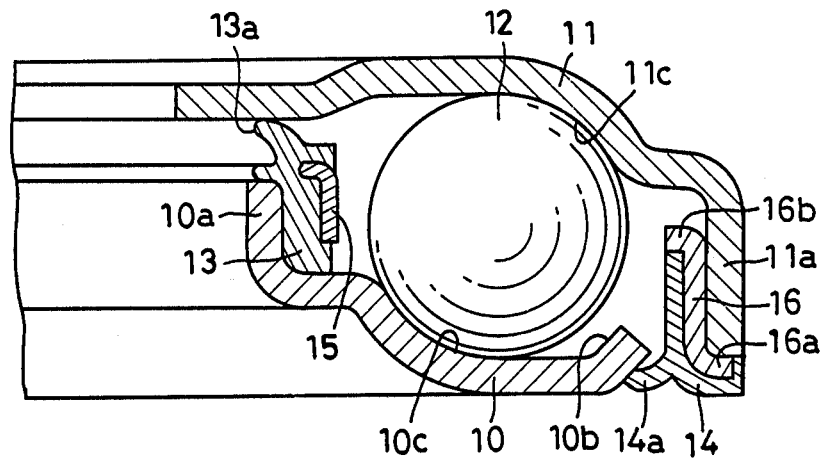
FIG. 1 is a fragmentary view in vertical section showing a sealed thrust ball bearing embodying the invention.
Figure 2:
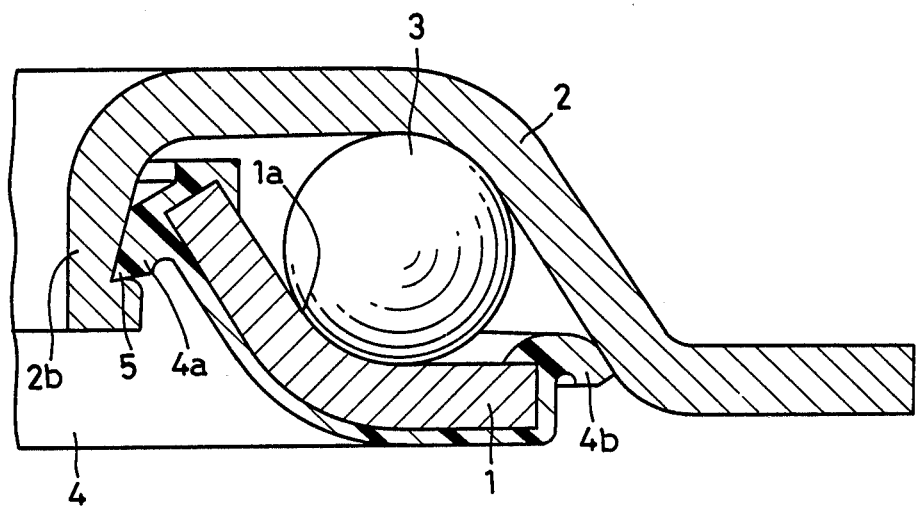
FIG. 2 is a fragmentary view in vertical section showing a conventional sealed thrust ball bearing.

The present invention will be described below in greater detail with reference to FIG. 1 which shows an embodiment of the invention.

The bearing comprises a first race 10, a second race 11, a plurality of balls 12 rollable therebetween, an inner elastic seal member 13 attached to the inner peripheral portion of the first race 10 for sealing a clearance between the inner peripheral portions of the first and second races 10, 11, and an outer elastic seal member 14 attached to the outer peripheral portion of the second race 11 for sealing a clearance between the outer peripheral portions of the first and second races 10, 11.

The two races 10, 11 are prepared by press forming and are preferably coated with a corrosion inhibitive plating. The two races 10, 11 are opposed to each other axially thereof with the balls 12 held therebetween. The first race 10 is formed at its inner periphery with a hollow cylindrical portion 10a extending toward the second race 11. The second race 11 is formed at its outer periphery with a hollow cylindrical portion 11a extending toward the first race 10. The cylindrical portion 10a of the first race 10 is larger than the second race 11 in inside diameter, with the inner peripheral edge of the second race 11 projecting beyond the cylindrical portion 10a of the first race 10 radially inwardly thereof. The inside diameter of the cylindrical portion 11a of the second race 11 is larger than the outside diameter of the first race, with the cylindrical portion 11a positioned radially outwardly of the outer peripheral edge of the first race 10. The first race 10 is formed at its outer periphery with a bent portion 10b obliquely bent toward the second race 11.

The two seal members 13, 14, which are made of rubber, are bonded respectively to metal cores 15, 16 on the inner side thereof which are approximately in the form of a hollow cylinder. The inner seal member 13 is fitted to the outer side of the cylindrical portion 10a of the first race 10 and is secured thereto by the elastic force of the rubber. The inner seal member 13 is integrally formed with an inward lip 13a extending obliquely inward radially thereof into intimate contact with the axially inward surface of the inner peripheral portion of the second race 11. The outside diameter of the metal core 16 for the outer seal member 14 is slightly smaller than the inside diameter of the cylindrical portion 11a of the second race 11, and the core 16 is press-fitted in the cylindrical portion 11a. The core 16 has an outward flange 16a integral with its one end and in contact with the end face of the cylindrical portion 11a and is integrally formed with an inward flange 16b at the other end thereof fitted in the cylindrical portion 11a. The outer seal member 14 is integral with a lip 14a extending radially inwardly thereof into intimate contact with the axially outer surface of the bent portion 10b of the first race 10 to support the first race 10, whereby the first and second races 10, 11 are secured to each other in the form of an assembly.

The above components are assembled into the bearing in the following manner.

First, the inner seal member 13 is fitted around the cylindrical portion 10a of the first race 10. Next, the balls 12 are arranged on the first race 10, and the second race 11 is then placed over the assembly of the first race 10, the balls 12 and the inner seal member 13. Finally, the outer seal member 14 is forced into the cylindrical portion 11a of the second race 11. When the components are thus assembled, the races will not forcibly warp the lips of the seal members during the assembly unlike the conventional practice, consequently precluding damage to the lips during the assembly. The intimate contact of the outer lip 14a with the bent portion 10b holds the first and second races 10, 11 secured to each other in the form of an assembly.

In the case of the present bearing, the metal core 16 for the outer seal member 14 is formed with the inward flange 16b and can therefore be firmly fitted into the cylindrical portion 11a. Without the inward flange 16b, the metal core 16, when forced into the cylindrical portion 11a, would be inwardly deformed at its forward end to thereby enlarge the outer end of the cylindrical portion 11a and to result in a reduced fitting force therebetween. On the other hand, the core 16 with the inward flange 16b will not be deformed at its forward end when forced into the cylindrical portion 11a, enabling the cylindrical portion 11a to hold the core firmly fitted thereto without enlarging at the end portion. With the two seal members 13, 14 fitted to the cylindrical portions 10a, 11a of the races 10, 11, the fitting force will not be reduced even when the races 10, 11 are coated with a corrosion inhibitive plating. Further even if the races 10, 11 are distorted by hardening after press forming, it is unlikely that the seal material will flow onto the raceways 10c, 11c although such objection was encountered when the seal member was bonded in the prior art. The inner lip 13a and the outer lip 14a are less susceptible to wear since they are in contact with the smooth pressed surface of the races 11, 10. The inward lip 13a, extending obliquely inward radially of the seal member reliably prevents mud, water or the like from ingressing into the bearing. Preferably, the outer lip 14b exerts a reduced pressure on the bent portion 10b so as to follow this portion effectively.

What is claimed is:

1. A sealed thrust ball bearing comprising a first race, a second race, a plurality of balls rollable therebetween and elastic seal members sealing a clearance between the inner peripheral portions of the first and second races and a clearance between the outer peripheral portions of the races, wherein the first race is formed at its inner periphery with a hollow cylindrical portion extending toward the second race, the second race being formed at its outer periphery with a hollow cylindrical portion extending toward the first race, an inner elastic seal member being fixedly fitted to the outer side of the first race cylindrical portion, an outer elastic seal member being fixedly fitted to the inner side of the second race cylindrical portion, the inner elastic seal member having a lip in intimate contact with the inner peripheral portion of the second race, the outer elastic seal member having a lip supporting the axially outer face of the outer peripheral portion of the first race in intimate contact with the face.

2. A sealed thrust ball bearing as defined in claim 1 wherein the first race is formed at its outer periphery with a bent portion bent obliquely toward the second race, and the lip of the outer elastic seal member is in intimate contact with the axially outer face of the bent portion to support the first race.

3. A sealed thrust ball bearing as defined in claim 1 wherein the lip of the inner elastic seal member extends obliquely inward radially thereof into intimate contact with the axially inner face of the inner peripheral portion of the second race.

4. A sealed thrust ball bearing as defined in claim 1 wherein the outer elastic seal member is bonded to the inner side of a metal core substantially in the form of a hollow cylinder, and the metal core is pressfitted in the cylindrical portion of the second race.

5. A sealed thrust ball bearing as defined in claim 4 wherein the metal core has at its one end a flange in contact with the end face of the cylindrical portion of the second race and is formed with an inward flange at the other end thereof fitted in the cylindrical portion.

* * * * *